United States Patent
Carpenter et al.

(10) Patent No.: US 6,581,623 B1
(45) Date of Patent: *Jun. 24, 2003

(54) AUTO-SWITCHING GAS DELIVERY SYSTEM UTILIZING SUB-ATMOSPHERIC PRESSURE GAS SUPPLY VESSELS

(75) Inventors: Kent Carpenter, Newtown, CT (US); James Dietz, Danbury, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,300

(22) Filed: May 1, 2000

Related U.S. Application Data

(63) Continuation-in-part of application No. 09/356,020, filed on Jul. 16, 1999.

(51) Int. Cl.⁷ .......................... F17C 13/04; G05B 11/01; G05D 7/06; G06F 15/00
(52) U.S. Cl. ...................... 137/113; 137/2; 137/115.03; 137/115.09; 137/118.04; 137/487.5; 137/486; 137/597; 137/601.18; 137/614.17
(58) Field of Search ................... 137/111, 240, 137/486, 487.5, 597, 884, 601.18, 115.03, 115.08, 115.09, 115.13, 118.04, 119.06, 119.07, 601.19, 112, 113, 614.17; 95/103; 700/11, 12, 282; 702/138

(56) References Cited

U.S. PATENT DOCUMENTS

| | | | | |
|---|---|---|---|---|
| 3,390,698 A | * | 7/1968 | Carmichael et al. | 137/601.18 |
| 3,441,249 A | * | 4/1969 | Aslan | 137/601.18 |
| 3,707,161 A | * | 12/1972 | Crawford | 137/614.17 |
| 4,371,146 A | * | 2/1983 | Mese et al. | 137/614.17 |
| 4,597,406 A | * | 7/1986 | Loiseau et al. | 137/113 |
| 4,744,384 A | * | 5/1988 | Nakamura et al. | 137/113 |
| 5,152,309 A | | 10/1992 | Twerdochlib | 137/8 |
| 5,158,534 A | | 10/1992 | Berry et al. | 604/4 |
| 5,190,068 A | | 3/1993 | Philbin | 137/8 |
| 5,441,070 A | | 8/1995 | Thompson | 137/1 |
| 5,441,076 A | | 8/1995 | Moriya et al. | 137/486 |
| 5,497,316 A | * | 3/1996 | Sierk et al. | 700/11 |
| 5,518,528 A | | 5/1996 | Tom et al. | 95/103 |
| 5,771,178 A | | 6/1998 | Stemporzewski, Jr. et al. | 364/510 |
| 5,791,369 A | | 8/1998 | Nishino et al. | 137/269 |
| 5,816,285 A | * | 10/1998 | Ohmi et al. | 137/487.5 |
| 5,865,205 A | * | 2/1999 | Wilmer | 137/2 |
| 5,938,425 A | * | 8/1999 | Damrath et al. | 137/601.18 |
| 6,119,710 A | * | 9/2000 | Brown | 137/487.5 |
| 6,152,168 A | * | 11/2000 | Ohmi et al. | 137/487.5 |
| 6,178,995 B1 | * | 1/2001 | Ohmi et al. | 137/487.5 |
| 6,289,923 B1 | * | 9/2001 | Ohmi et al. | 137/487.5 |
| 6,314,992 B1 | * | 11/2001 | Ohmi et al. | 137/487.5 |

FOREIGN PATENT DOCUMENTS

GB 1105724 * 3/1968 ................. 137/113

* cited by examiner

Primary Examiner—George L. Walton
(74) Attorney, Agent, or Firm—Margaret Chappuis; Steven J. Hultquist; William F. Ryann

(57) ABSTRACT

An auto-switching sub-atmospheric pressure gas delivery system, for dispensing gas to a gas-consuming process unit, e.g., a semiconductor manufacturing tool, without the occurrence of pressure spikes or flow perturbations.

45 Claims, 2 Drawing Sheets

AUTO-SWITCHING GAS DELIVERY SYSTEM UTILIZING SUB-ATMOSPHERIC PRESSURE GAS SUPPLY VESSELS

CROSS-REFERENCE TO RELATED APPLICATION

This is a continuation-in-part of U.S. patent application Ser. No. 09/356,020 filed Jul. 16, 1999 in the name of James Dietz.

Incorporation by Reference of Prior Copending Application

The entire disclosure, including specification, drawings and claims, of prior copending U.S. patent application Ser. No. 09/356,020 filed Jul. 16, 1999 in the name of James Dietz for "AUTO-SWITCHING GAS DELIVERY SYSTEM UTILIZING SUB-ATMOSPHERIC PRESSURE GAS SUPPLY VESSELS" is hereby incorporated herein by reference.

BACKGROUND OF THE INVENTION

1. Field of the Invention

This invention relates to a sub-atmospheric pressure gas delivery system for supplying gas to a gas-consuming process facility such as a semiconductor manufacturing tool, wherein the system utilizes sub-atmospheric gas supply vessels and is auto-switchable in character from an empty vessel to a full one without pressure spikes or flow perturbations.

2. Description of the Related Art

In the semiconductor manufacturing field, source vessels of gaseous chemical reagents are commonly used to supply process gases to various tools in the manufacturing facility. These source vessels have traditionally been high pressure gas cylinders mounted in gas cabinets of various designs. The gas cabinets provide a controlled microenvironment for the gas cylinders, and are typically equipped with flow circuitry, flow regulator devices (e.g., mass flow controllers, restricted flow orifice elements, flow control valves, valve actuators, etc.), and gas flow/process monitoring, control and output elements such as displays, gauges, recorders, sensors, microprocessors, central processing units (CPUs), and the like.

In order to provide for continuity of process operation, the gas cabinet may contain multiple gas cylinders manifolded together and arranged for sequential use, and coupled with mass flow controllers (MFCs) to regulate the flow of the dispensed gas. In such gas cabinet arrangement, a cylinder, once it is exhausted or nearing an empty condition, is "switched out" of active feed relationship to the associated gas-consuming process, and replaced with a "switched in" fresh cylinder containing the gaseous reagent to be supplied to the associated process. The switching may be manual in character, but more typically is an automated operation ("auto-switchover") under the control of a computer-based monitoring and control system.

Auto-switchover of high pressure gas cylinders is a common practice, for which gas cabinets are readily commercially available from most gas cabinet manufacturers. The auto-switchover operation itself is easily accomplished, because high pressure gases (e.g., at 1500 psig supply pressures) from supply cylinders are typically regulated down to a lower pressure level (on the order of 35 psig, for example) for use in the semiconductor manufacturing facility. The auto-switchover takes place at the lower, regulated pressure, making the change seamless in character. This change does not upset the MFCs in the flow circuitry joined to the high pressure cylinders.

High pressure gas cylinders, however, present a safety issue in respect of possible leakage of gas from the valve head or bulk dissemination of the gas in the event of rupture of the cylinder. The gases typically used in the semiconductor manufacturing facility and supplied from high pressure gas cylinders are highly toxic, and may also be pyrophoric and/or explosive in character.

As a result of these dangers, sub-atmosphericpressure gas supply systems, e.g., of the type disclosed in U.S. Pat. No. 5,518,528 issued May 21, 1996 in the names of Glenn M. Tom and James V. McManus, have come into widespread usage in the semiconductor manufacturing facility. The sub-atmosphericpressure gas supply system described in the Tom et al. patent utilizes a storage and dispensing vessel, which may be of the same type as used for high pressure gas storage, but which contains a physical adsorbent material holding a sorbate gas (e.g., a hydride gas, halide gas, gaseous organometallic Group V compound, or the like), in an adsorbed state, at sub-atmosphericpressure.

The sorbent medium employed in the gas supply system disclosed in the Tom et al. patent may comprise a zeolite or activated carbon material. The gas is dispensed in use of the system by pressure differential-mediated and/or thermal differential-mediated desorption, optionally with flow of a carrier gas through the gas storage and dispensing vessel providing a concentration differential effecting desorption of the gas from the physical adsorbent in the vessel.

As a result of their sub-atmosphericpressure operating characteristic, the physical adsorbent-based gas supply system of the Tom et al. patent have been widely adopted as a safe and reliable gas supply product for semiconductor manufacturing operations, in preference to high pressure cylinder gas sources.

Despite their benefits, however, when used in manifolded arrangements involving switching from a depleted gas supply vessel to a fresh (full) vessel in the operation of the system, as in gas cabinets containing two or more gas supply vessels arranged for such switchover operation, sub-atmospheric pressure gas sources cause substantial pressure perturbations to occur in the associated flow circuitry.

Such pressure perturbations destabilize the MFCs in the flow circuitry joined to the sub-atmospheric pressure gas sources.

As a result, the flow rate of gas supplied to the downstream process is likewise destabilized and may be higher, lower or significantly variable in relation to the desired set point flow rate for the downstream process.

These switchover-related variations from normal desired operating conditions can result in wafer defects in the semiconductor manufacturing operation, which in turn may necessitate costly reworking or even rejection of the corresponding semiconductor product articles.

It would therefore be a significant advance in the art to provide an improved means and method for operation of manifolded sub-atmospheric pressure gas supply vessels, which avoid pressure spikes and other adverse flow behavior incident to switchover of the sub-atmosphericpressure vessels, in a gas cabinet or otherwise.

It is accordingly an object of the present invention to provide an improved auto-switching sub-atmospheric pressure gas delivery system that overcomes such pressure perturbation problems.

It is another object of the invention to provide an auto-switching sub-atmospheric pressure gas delivery system for sub-atmospheric pressure sorbent-based gas storage and dispensing vessels in a gas cabinet containing such auto-switchable vessels.

It is a still further object of the invention to provide an auto-switching sub-atmospheric pressure gas delivery system that is easily fabricated and efficiently operable to minimize pressure perturbations in switchover operation of the system.

Other objects and advantages of the invention will be more fully apparent from the ensuing disclosure and appended claims.

SUMMARY OF THE INVENTION

The present invention relates to an auto-switching sub-atmospheric pressure gas delivery system for dispensing of sub-atmospheric pressure gas for use in applications such as the manufacture of semiconductor products.

In one aspect, the invention relates to an auto-switchable sub-atmospheric pressure gas delivery system including a plurality of sub-atmospheric pressure gas supply vessels coupled to a valved gas dispensing manifold, wherein subsequent to auto-switching an on-line gas supply vessel is arranged to dispense gas for flow through the valved gas dispensing manifold for discharge therefrom, with flow control valve in the manifold being maintained in an open dispensing state during the flow through the valved gas dispensing manifold for discharge therefrom.

The system according to such aspect of the invention comprises means for restrictively flowing gas from the on-line gas supply vessel into the valved gas dispensing manifold to progressively build pressure in the valved gas dispensing manifold to a gas dispensing pressure level for said discharge with the flow control valve in the open dispensing state, and for opening the flow control valve to the open dispensing state after said gas dispensing pressure level has been reached.

In such auto-switchable sub-atmospheric pressure gas delivery system, the aforementioned means may for example be means of the following type:

(i) a bleed flow passage in the flow control valve;
(ii) a gas flow by-pass loop associated with the flow control valve;
(iii) a valve actuator programmably arranged to actuate the flow control valve in a pressure-building mode selected from the group consisting of:
  (a) progressively opening of the flow control valve; and
  (b) pulsed opening/closing of the flow control valve.

In another aspect, the present invention relates to auto-switching sub-atmospheric pressure gas delivery system, comprising:

a gas dispensing manifold;
a plurality of sub-atmospheric pressure gas supply vessels, each said gas supply vessel being joined to the gas dispensing manifold and including a vessel valve that is selectively openable to establish gas flow communication of the gas supply vessel with the gas dispensing manifold, and selectively closeable to terminate gas flow communication of the gas supply vessel with the gas dispensing manifold;
a plurality of flow control valves in the gas dispensing manifold, each associated with a corresponding one of the plurality of sub-atmospheric pressure gas supply vessels and positioned in the manifold downstream from vessel valve of the associated sub-atmospheric pressure gas supply vessel;
a plurality of bleed flow passages, each associated with a corresponding one of the flow control valves in the gas dispensing manifold and arranged to flow gas therethrough in bypassing relationship to the associated flow control valve, at a restricted low flow rate in relation to flow rate of gas through the associated flow control valve when the associated flow control valve is open and gas is flowed therethrough from an associated sub-atmospheric pressure gas supply vessel; and
a controller arranged to selectively operate the flow control valves so that a flow control valve is opened only after (i) gas flow is established by opening a vessel valve of the associated sub-atmospheric pressure gas supply vessel, and (ii) gas flow through the bleed flow passage associated with that flow control valve has caused gas pressure in the manifold to rise to an operating level for gas dispensing operation involving flow of gas out of the manifold.

Another aspect of the invention relates to an auto-switching sub-atmospheric pressure gas delivery system comprising a gas cabinet containing a gas delivery manifold arranged for delivering gas from the gas cabinet, and a plurality of gas supply vessels each coupled in latent gas flow communication with the manifold for said delivery of gas from the gas cabinet from a selected one of the plurality of gas supply vessels, with means for valvably establishing gas flow from the selected one of the plurality of gas supply vessels to the manifold and valvably isolating selected other(s) of the plurality of gas supply vessels from gas flow communication with the manifold, a controller for auto-switching of the vessels in sequence for flow of gas from a selected one of the plurality of gas supply vessels to the manifold until its depletion followed by switching of a new selected one of the plurality of gas supply vessels to the manifold and isolation of the selected other(s) of the plurality of gas supply vessels, and restricted flow means for flowing gas from a selected one of the gas supply vessels at auto-switching thereof into gas flow communication with the manifold to pressurize the manifold prior to valvably establishing gas flow from the selected one of the plurality of gas supply vessels to the manifold.

In a further aspect, the invention relates to a method of dispensing gas from an assembly of sub-atmospheric pressure gas supply vessels secured to a valved manifold arranged to selectively connect successive ones of the gas supply vessels in sequence to the manifold, by opening of an associated valve isolating a selected vessel from gas communication with the manifold and closing of an associated valve of a vessel depleted of gas, said method comprising restrictively flowing gas from the selected vessel into the manifold to pressurize the manifold to an operating pressure level during switchover of gas supply from said vessel depleted of gas, to a previously isolated selected vessel.

A still further aspect of the invention relates to a method of auto-switching sub-atmospheric pressure gas delivery, comprising:

providing a sub-atmospheric pressure gas delivery system described hereinabove;
flowing gas from a selected one of said plurality of sub-atmospheric pressure gas supply vessels to the gas dispensing manifold at a dispensing pressure, with the vessel valve of said selected one of said gas supply vessels open, the flow control valve associated with the selected one of the gas supply vessels open, and the vessel valve of a second one of said gas supply vessels closed, until pressure in the selected one of the gas supply vessels has declined to a level requiring switchover;

closing the vessel valve of said selected one of said gas supply vessels open and the flow control valve associated therewith, and concurrently opening the vessel valve of the second one of said gas supply vessels while maintaining the flow control valve associated with the second one of said gas supply vessels closed;

bleeding gas from the second one of said gas supply vessels through the bleed flow passage associated with the flow control valve for said second one of said gas supply vessels, until the gas pressure in the manifold rises to dispensing pressure; and when gas pressure in the manifold has risen to dispensing pressure, opening the flow control valve for said second one of said gas supply vessels.

Another aspect of the invention relates to an auto-switching sub-atmospheric pressure gas delivery method comprising providing a gas cabinet containing a gas delivery manifold arranged for delivering gas from the gas cabinet, and a plurality of gas supply vessels each coupled in latent gas flow communication with the manifold for said delivery of gas from the gas cabinet from a selected one of the plurality of gas supply vessels, with means for valvably establishing gas flow from the selected one of the plurality of gas supply vessels to the manifold and valvably isolating selected other(s) of the plurality of gas supply vessels from gas flow communication with the manifold, and auto-switching the vessels in sequence for flow of gas from a selected one of the plurality of gas supply vessels to the manifold until its depletion followed by switching of a new selected one of the plurality of gas supply vessels to the manifold and isolation of the selected other(s) of the plurality of gas supply vessels, and flowing gas from a selected one of the gas supply vessels at auto-switching thereof into gas flow communication with the manifold to pressurize the manifold prior to establishing gas flow from the selected one of the plurality of gas supply vessels to the manifold.

Other aspects, features and embodiments in the invention will be more fully apparent from the ensuing disclosure and appended claims.

DETAILED DESCRIPTION OF THE INVENTION, AND PREFERRED EMBODIMENTS THEREOF

The present invention relates to a sub-atmospheric pressure gas delivery system having auto-switch capability that permits transition from a depleted sub-atmospheric pressure gas supply vessel to a full sub-atmospheric pressure gas supply vessel without the occurrence of pressure spikes and associated flow anomalies that can adversely affect the downstream gas-consuming process. As a result, the system of the invention allows for uninterrupted delivery of sub-atmospheric pressure gas to individual or multiple process tools or to a sub-atmospheric pressure gas distribution system.

Sub-atmospheric pressure gas supply sources of various types may be employed in the broad practice of the present invention. Preferred sub-atmospheric gas supply sources include the sorbent-based gas storage and dispensing systems of the aforementioned Tom et al. U.S. Pat. No. 5,518,528, the disclosure of which is hereby incorporated herein by reference in its entirety.

Figure 1:
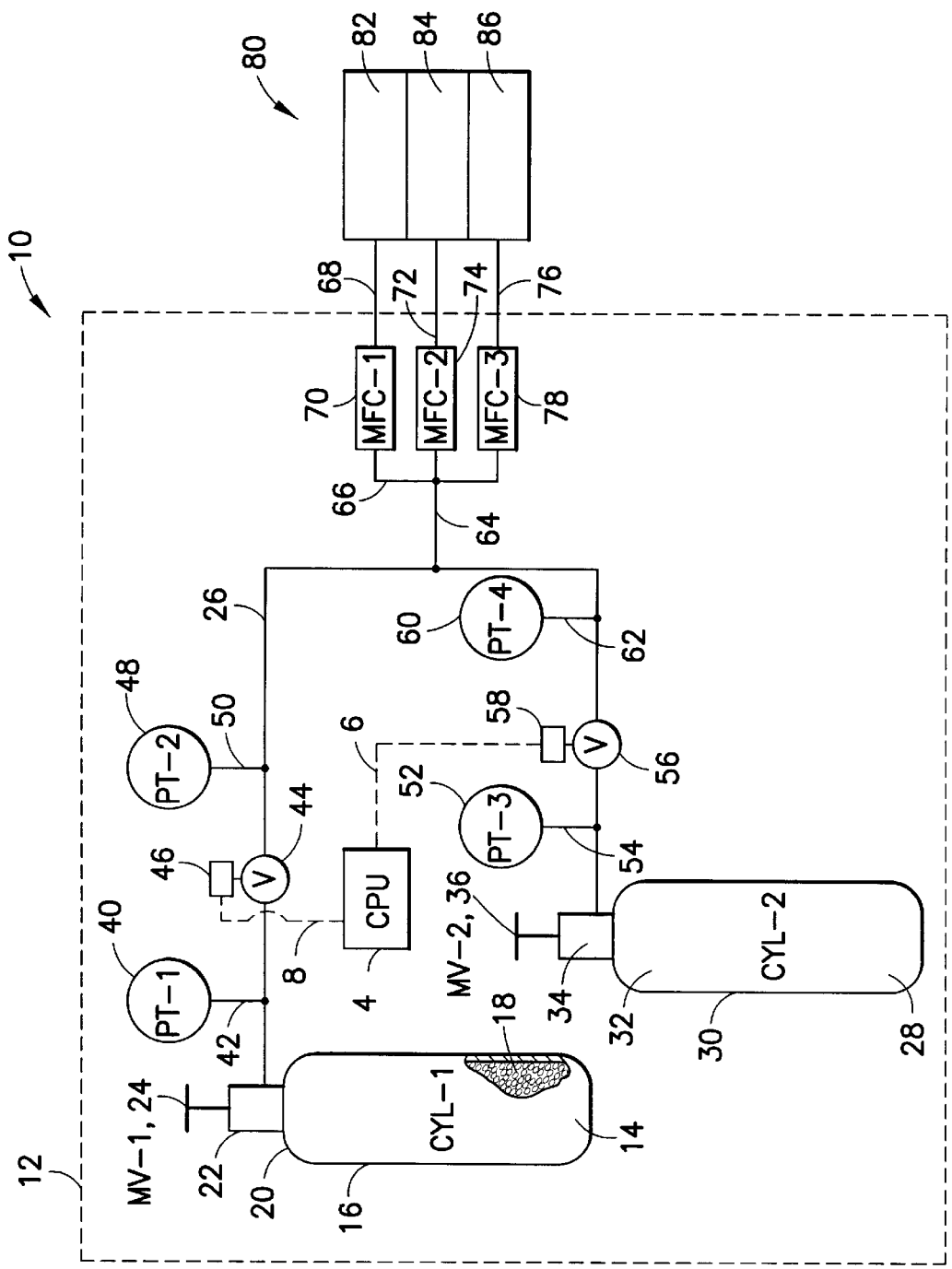
FIG. 1 is a schematic representation of an auto-switching sub-atmospheric pressure gas delivery system according to one embodiment of the present invention.

FIG. 1 is a schematic representation of an auto-switching sub-atmospheric pressure gas delivery system 10 according to one embodiment of the present invention.

As shown in FIG. 1, the system 10 employs a gas cabinet 12 (schematically represented by the correspondingly numbered dashed line in the drawing) containing two sub-atmospheric pressure gas supply vessels 14 and 28 manifolded to one another by the gas cabinet manifold line 26.

The sub-atmospheric pressure gas supply vessel 14 as shown includes a casing 16 at the upper neck region 20 of which is provided a valve head 22 with associated valve 24 (MV-1). The valve 24 may be a manually operated (e.g., hand wheel-type) valve or it may alternatively be an automatically operated valve having an associated valve actuator and controller (not shown).

The sub-atmospheric pressure gas supply vessel 14 contains a bed of sorbent 18 having sorptive affinity for a gas that is physically adsorbed thereon. The sorbent may be a material such as a zeolite, silica, alumina, carbon (e.g., bead activated carbon), or the like, sorptively loaded with a gas. The gas may be a gas dispensed for semiconductor manufacturing, such as hydride gases, halide gases, and gaseous organometallic compounds and complexes. Specific gas species may include, e.g., arsine, phosphine, boron trifluoride, boron trichloride, diborane, silane, halosilanes, etc.

The second sub-atmospheric pressure gas supply vessel 28 is analogously constructed to vessel 28, including a casing 30 with an upper neck region 32 to which a valve head 34 is secured, featuring a valve 36 (MV-2).

The sub-atmospheric pressure gas supply vessels 14 and 28 are each joined, by suitable coupling or fitting means (not shown) to the manifold line 26. The manifold assembly includes pressure tap 40 (PT-1) joined by pressure tap line 42 to the manifold line 26, modified valve 44, as described more fully hereafter, having an associated valve actuator 46 controllably linked by signal transmission line 8 to the central processing unit 4, which may comprise a computer or microprocessor or other process means for controlling the actuator and associated valve. The valve actuator may be of any suitable type, e.g., electrical, electromechanical, pneumatic, etc. The CPU may be programmably arranged to carry out a cycle time program for auto-switching of the sub-atmospheric pressure gas supply vessels into sequential gas flow relationship with the manifold.

Downstream from valve 44 is a second pressure tap 48 (PT-2) connected to the manifold line 26 by pressure tap line 50.

The portion of the manifold line 26 associated with the second sub-atmospheric pressure gas supply vessel 28 includes the pressure tap 52 (PT-3) connected to the manifold line by pressure tap line 54 and pressure tap 60 (PT-4) connected to the manifold line by pressure tap line 62. Between the pressure taps 52 and 60 is a modified flow control valve 56 which may be of the same type as valve 44, having an associated valve actuator 58 controllably linked by signal transmission line 6 to the central processing unit 4.

The modified flow control valves 44 and 56 are flow control valves that are each modified by provision therein of a bleed orifice from the inlet to the outlet of the valve. Such orifice may be formed by drilling the orifice through the valve body to provide a bleed flow passage therein of the required character, communicating with the inlet and outlet of the valve. The bleed passage may also be formed in any other suitable manner to provide the bleed flow passage for the valve.

The dimensions of the bleed flow passage may readily be determined without undue effort by simple pressure/flow tests for passages of different dimensions, to establish a flow conductance relationship to the dimensional character of the bleed flow passage that will permit the selection of a specific dimensional character (diameter and length) of the bleed flow passage in a given application of the gas supply system of the present invention.

The manifold line 26 is connected to discharge line 64, which in turn is connected to a discharge manifold line 66. The discharge manifold line 66 is coupled with three gas feed lines 68, 72 and 76 containing mass flow controllers 70 (MFC-1), 74 (MFC-2) and 78 (MFC-3), respectively, as shown.

The three gas feed lines 68, 72 and 76 are coupled in gas supply relationship to sections 82, 84 and 86 of the semiconductor manufacturing facility 80, respectively. The respective sections 82, 84 and 86 of the semiconductor manufacturing facility schematically represent different tools or use locations in the semiconductor manufacturing facility, it being understood that the arrangement shown is for illustrative purposes only, and that in general, any number of suitable gas feed lines may be connected to the gas cabinet 12.

Further, in place of the specifically described semiconductor manufacturing facility, any other gas-consuming process facility may be utilized as the user of gas supplied by the gas supply system of the invention.

In operation of the FIG. 1 system, assuming that gas supply vessel 14 has been onstream in active gas supplying operation, with the valve 24 (MV-1) and valve 44 open, so that gas is desorbed from the sorbent 18 in the vessel and flows through the manifold line 26 to the semiconductor manufacturing facility 80, the pressure of the gas dispensed from vessel 14 declines as the vessel is depleted of gas in ongoing operation, finally reaching a changeover pressure level, e.g., on the order of 20 Torr. Meanwhile, the fresh vessel 28, at a pressure on the order of 650 Torr, is coupled in the gas supply system to the manifold line 26, with the valves 36 (MV-2) and 56 closed.

At the moment of changeover, the depleted vessel 14 is shut off by closure of the valve 24 (MV-1), valve 44 is closed by the actuation of valve actuator 46 via a signal transmitted from CPU 4 through signal transmission line 8 to the valve actuator 46, and the valve 36 (MV-2) on the fresh vessel 28 is opened.

The opening/closing of the valves 24 (MV-1) and 36 (MV-2) may be carried out manually according to a operating cycle of predetermined time character, or alternatively the valves 24 (MV-1) and 36 (MV-2) may be controllably linked to the CPU 4 by suitable actuator and signal transmission means (not shown) so that the valves on the valve heads of the respective vessels can be automatically operated in accordance with a cycle time program stored in or otherwise provided by the CPU.

As a result of the change in the status of valves 24 (MV-1) and 36 (MV-2), gas will flow from vessel 28 through the valve head passage of valve head 34 into the manifold line 26, and flow (bleed) through the bleed flow passage of the valve 56, thereby gradually increasing the pressure of the gas supply manifold measured at pressure taps 52 (PT-3) and 60 (PT-4).

The rate of increase in pressure being controlled by the flow conductance of the bleed flow passage, as previously determined and provided, so that the pressure rise does not affect the operability of the mass flow controllers 70 (MFC-1), 74 (MFC-2) and 78 (MFC-3), and steady-state, uninterrupted flow of the dispensed gas is achieved over the course of the auto-switching operation.

As the pressure in the gas supply manifold line 26 approaches the new vessel pressure of 650 Torr, the valve 56 is opened, allowing an unrestricted flow of the gas from vessel 28 to be flowed through the manifold line 26 to the semiconductor manufacturing facility 80.

The manifold of the FIG. 1 system is thus valvably (by operation of valve elements) arranged for sequential switchover of the gas supply vessels, in series, by appropriate control of the various manifold and vessel valves so that dispensing pressure is maintained in the manifold appropriate to prevent destabilizing perturbations of the mass flow controllers from occurring.

Figure 2:
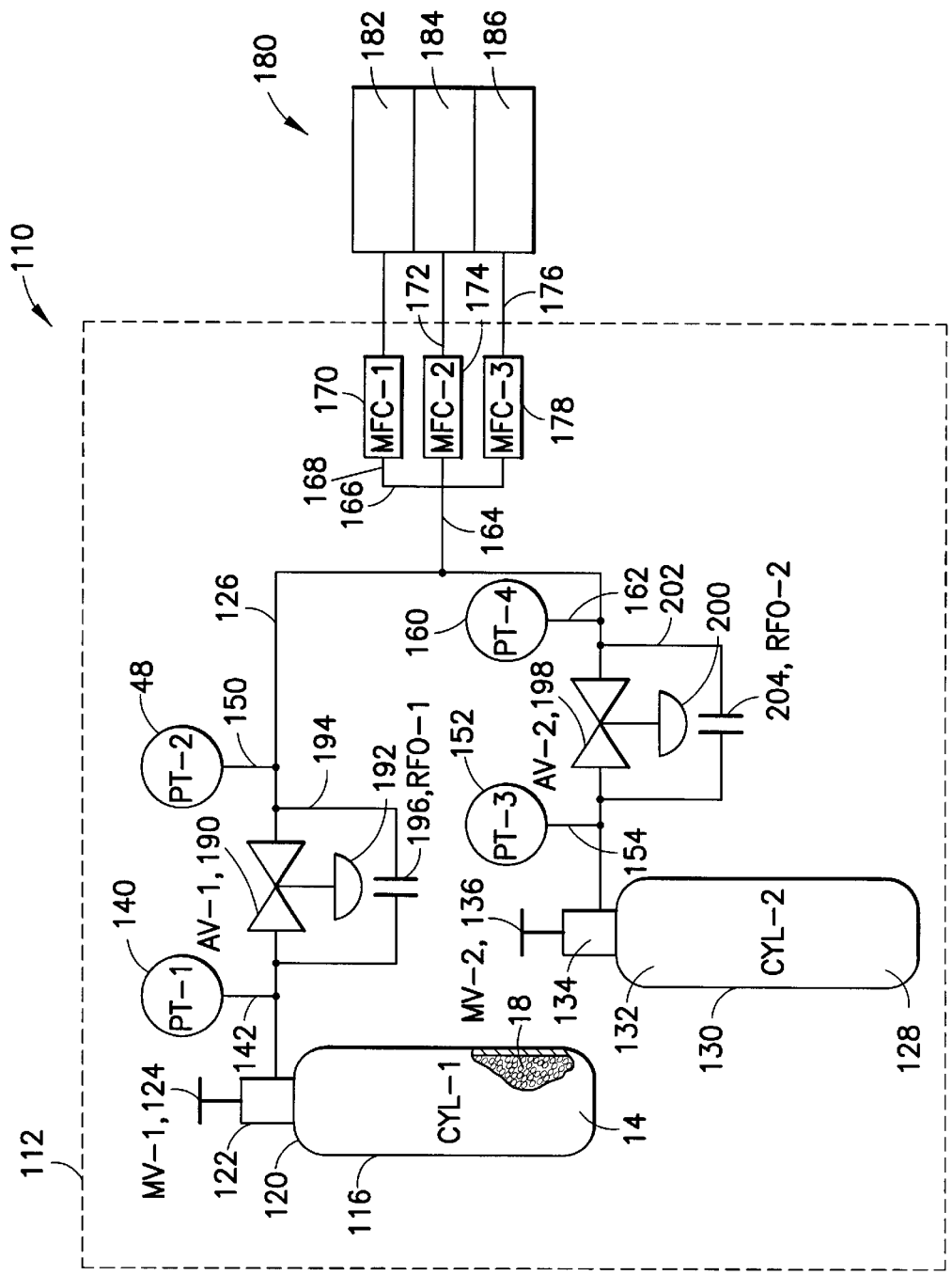
FIG. 2 is a schematic representation of an auto-switching sub-atmospheric pressure gas delivery system according to another embodiment of the present invention.

FIG. 2 is a schematic representation of an auto-switching sub-atmospheric pressure gas delivery system 110 according to another embodiment of the present invention. In the FIG. 2 embodiment, system elements corresponding to those of the FIG. 1 embodiment are numbered correspondingly to the same elements in FIG. 1, by the addition in the FIG. 2 numbering scheme of 100 to the reference numerals of the same system elements in FIG. 1.

The FIG. 2 system thus differs from the FIG. 1 system in the provision of unmodified flow control valves 190 and 198, each of which is associated with a bypass loop containing a restricted flow orifice. Thus, the flow control valve 190 (AV-1) is disposed in manifold line 26 with the manifold line upstream and downstream of the valve being joined to bypass loop 194 containing restricted flow orifice 196 (RFO-1). The valve actuator 192 of valve 190 (AV-1) in turn is coupled to a CPU of the type shown schematically in FIG. 1, or otherwise controllably arranged in the manifold for automatic switching thereof.

Correspondingly, the flow control valve 198 (AV-2) is disposed in manifold line 26 with the manifold line upstream and downstream of the valve being joined to bypass loop 202 containing restricted flow orifice 204 (RFO-2). The valve actuator 200 of valve 198 (AV-2) is likewise coupled to a CPU of the type shown schematically in FIG. 1, or otherwise controllably arranged in the manifold.

The dimensions of the respective gas flow orifices may be selectively determined without undue effort, by the same empirical approach discussed above in respect of determining appropriate dimensional characteristics of the bleed flow passages in the modified vales of the FIG. 1 embodiment, to achieve a desired flow conductance for the gas flows through the restricted flow orifices 196 (RFO-1) and 204 (RFO-2) in the parallel flow paths (bypass flow loops 194 and 202) associated with the respective valves 190 (AV-1) and 198 (AV-2). The size of the orifice is most strongly determined by the gas characteristics, but may for example be in the range of from about 0.004 to about 0.020 inches in diameter.

The operation of the FIG. 2 system is conducted analogously to that of FIG. 1, with the bypass loop and restricted flow orifice elements serving the same function as the bleed flow passage in each of the modified valves of FIG. 1.

In the FIG. 2 system, additional flexibility may be provided in the gas supply system by providing the restricted flow orifice elements as variable restriction elements, so that the flow conductance of the bypass loop flow can be selectively modified during use of the system, to accommodate different sub-atmospheric pressure levels, downstream gas-consuming operations, and types of gases in the use and deployment of the gas cabinet.

It will be recognized that the invention is amenable to use in applications other than gas cabinet deployment, in other instances where sub-atmospheric pressure gas supply vessels are arranged in sequential feed relationship with a gas-consuming installation or location.

Furthermore, the invention may be variously configured to provide integration of the monitoring elements and instrumentation in the gas supply system, to provide feedback adjustment capability for set point or optimized operation of the system. For example, the pressure taps (PT-1, PT-2, PT-3 and PT-4) in the FIGS. 1 and 2 systems may be controllingly linked to the CPU and employed to vary the cycle time and actuation of the various system valves. The mass flow controllers may independently or interdependently arranged to be adjusted as to their respective set points. The CPU cycle may be programmatically varied with temperature compensation via thermocouple sensing at respective locations in the gas cabinet and associated temperature adjustment feedback systems. Many other modifications and variations are possible with the auto-switching system of the present invention.

By way of example, one such modification within the broad scope of the present invention utilizes unmodified variably-openable valves to control the rate of pressure rise in the dispensing manifold. In such alternative embodiment, a system arranged as shown for example in FIG. 1 may be used, in which the valves 44 and 56 are not modified by provision of bleed flow passages as previously described, but rather are standard variably openable valves whose extent of opening is controlled by the associated valve actuators 46 and 58, respectively.

By such arrangement, the degree of opening of each of the valves 44 and 56 is modulated by the CPU 4. The CPU 4 therefore is suitably programmably arranged in a feed back loop arrangement with the downstream pressure taps 48 and 60, which in such modified embodiment may constitute pressure transducers arranged in signal generating and transmission relationship with the CPU (e.g., by generating an infrared pressure signal at the pressure transducer and transmitting same to an IR port on the CPU 4 for signal processing by the CPU.

When a fresh cylinder is brought on line, the CPU functions to programmatically monitor the pressure sensed by the pressure transducer (48 or 60) and to responsively adjust the valve opening of the associated valve (44 or 56, respectively) so as to progressively open the valve and maintain a predetermined rate of pressure rise in the dispensing manifold during the progressive opening, finally reaching a fully open state.

In this manner, the pressure in the dispensing manifold is slowly brought up to operating pressure, in a manner controlled by the CPU in response to the actual sensed downstream pressure in the manifold.

In another illustrative modification within the broad scope of the present invention, the system of FIG. 1 may again be utilized, but wherein the valves 44 and 56 are standard two-state (open/closed) valves, which are either fully open or else fully closed. In this alternative arrangement, the pressure sensed by the pressure transducer (48 or 60) in the dispensing manifold is transmitted to the CPU 4. In response, as the fresh cylinder introduces fresh feed gas into the manifold, the CPU pulses open the associated valve (44 or 56, respectively) so that it is open momentarily and then closed again. The pressure then is sensed again in the dispensing manifold, and the valve is pulsed again, with this process of pressure sensing and valve pulsing being sequentially and repetitively carried out, to controllably raise the pressure to the desired level at which point the valve is fully open and left open for subsequent dispensing.

In such embodiment, the frequency and the duration of the pulses can be programmatically varied by the CPU as necessary or desired, to achieve a selected pressure rise profile in the manifold to thereby avoid switchover of the gas supply vessels without the incidence of pressure spikes or flow perturbations.

The present invention thus provides an auto-switchover gas supply system that avoids destabilizing pressure and flow variations in the system when sub-atmospheric gas supply vessels are changed out with continuity of operation. The invention therefore functions to smooth the potentially deleterious gas flow variations, to achieve a normalized continuous flow of gas to the downstream gas-consuming facility.

This auto-switching system of the invention prevents large pressure waves from being propagated through the delivery line as a result of auto-switching between empty and full sub-atmospheric pressure cylinders. Such auto-switching system thereby ensures continuous delivery of sub-atmospheric pressure gas in applications without the perturbations that would otherwise occur in the absence of the pressure-damping flow circuitry features of the present invention.

Further, by avoiding the occurrence of pressure spikes during the auto-switchover sequence, the gas delivery system of the invention functions to minimize particle shedding from individual system components, in the operation of the system. As a result, the purity of the gas dispensed by the gas delivery system is maintained at a high level, as is necessary in gas-consuming operations such as semiconductor manufacturing, where deviations from the set point purity level may yield a semiconductor product that is defective or even useless for its intended purpose.

The features and advantages of the invention will be more fully apparent from the following illustrative and non-limiting examples.

EXAMPLE 1

A gas cabinet of the type shown in FIG. 1 but lacking the auto-switchover pressure surge-damping features of the present invention (including the modified valves 44 and 56), is operated in auto-switched mode. The on-line cylinder 14 (CYL-1) is gradually evacuated as the gas is drawn off, eventually ending up at pressure as low as 20 Torr as measured at pressure taps 40 (PT1) and 48 (PT2). The fresh cylinder 28 (CYL-2) that is to be placed on line is at a pressure of 650 Torr measured at pressure tap 52 (PT3). If the fresh cylinder is simply opened up, the supply piping pressure measured at pressure taps 48 (PT2) and 60 (PT4) will rapidly rise to 650 Torr. This rapid pressure rise will destabilize the MFCs 70, 74 and 78 (MFC-1, MFC-2 and MFC-3, respectively) connected to the supply piping, resulting in higher, lower or fluctuating gas flow to the process, relative to the desired operation. As mentioned herein earlier, such a change in gas flow can result in wafer defects in the semiconductor products produced by the downstream semiconductor manufacturing facility 80.

EXAMPLE 2

A gas cabinet corresponding to that employed in Example 1 but having the auto-switchover pressure surge-damping features of the present invention (including the modified valves 44 and 56) is operated in auto-switched mode.

At the changeover from the depleted on-line cylinder 14 (CYL-1) to the fresh cylinder 28 (CYL-2), the depleted cylinder 14 (CYL-1) is valved off by closing valve 24 (MV1), the valve 56 with the bleed orifice is closed and valve 36 (MV2) on the fresh cylinder 28 (CYL2) is opened. Gas from the full cylinder 28 (CYL2) will then flow (bleed) through the orifice of valve 56 at a slow rate, gradually increasing the pressure in the supply manifold 26 measured at pressure taps 48 (PT2) and 60 (PT4). The rate of increase in the pressure is controlled so that the operation of the MFCs 70, 74 and 78 is not affected. As the pressure in the manifold approaches the new cylinder pressure of 650 Torr, the valve 56 is opened, allowing an unrestricted flow path through the valve 56 from the cylinder 28 (CYL-2) to the manifold 26.

While the invention has been illustratively described herein with reference to specific elements, features and embodiments, it will be recognized that the invention is not thus limited in structure or operation, but rather is intended to be broadly construed in view of the disclosure herein, as comprehending variations, modifications and other embodiments as will readily suggest themselves to those of ordinary skill in the art.

What is claimed is:

1. An auto-switching sub-atmospheric pressure gas delivery system, comprising:
   a gas dispensing manifold;
   a plurality of sub-atmospheric pressure gas supply vessels, each said gas supply vessel being joined to the gas dispensing manifold and including a vessel valve that is selectively openable to establish gas flow communication of the gas supply vessel with the gas dispensing manifold, and selectively closeable to terminate gas flow communication of the gas supply vessel with the gas dispensing manifold;
   a plurality of flow control valves in the gas dispensing manifold positioned in the manifold downstream from the vessel valve of the associated sub-atmospheric pressure gas supply vessel, each control valve associated with a corresponding upstream and downstream pressure transducer and one of the plurality of sub-atmospheric pressure gas supply vessels;
   at least one mass flow controller downstream of said gas manifold and upstream of a process tool to provide a steady-state, uninterrupted flow of gas from the gas supply vessel to the process tool;
   a plurality of bleed flow passages, each associated with a corresponding one of the flow control valves in the gas dispensing manifold and arranged to flow gas therethrough in bypassing relationship to the associated flow control valve, at a restricted low flow rate in relation to flow rate of gas through the associated flow control valve when the associated flow control valve is open and gas is flowed therethrough from an associated sub-atmospheric pressure gas supply vessel, wherein a flow conductance of said bleed flow passages ensures a gradual pressure increase downstream of said flow control valves; and
   a CPU operatively linked to the valves and pressure transducers, for switching of the gas supply vessels for flow of gas from a selected one of the plurality of gas supply vessels to the manifold until its depletion followed by switching to a new selected one of the plurality of gas supply vessels to the manifold by selectively operating the vessel valves and flow control valves so that dispensing pressure is maintained in the manifold appropriate to prevent destabilizing perturbations of the mass flow controllers from occurring.

2. The auto-switching sub-atmospheric pressure gas delivery system of claim 1, wherein each flow control valve comprises a corresponding valve body with an inlet and an outlet each of which are joined in flow communication with the manifold, and wherein the bleed flow passage associated with a corresponding flow control valve comprises a bleed flow passage through the valve body of said corresponding flow control valve, interconnecting the inlet and outlet and permitting flow of gas therethrough regardless of opened or closed state of said corresponding flow control valve.

3. The auto-switching sub-atmospheric pressure gas delivery system of claim 2, wherein the bleed flow passage comprises a passage drilled through the valve body.

4. The auto-switching sub-atmospheric pressure gas delivery system of claim 1, wherein the bleed flow passage associated with a corresponding flow control valve comprises a bypass loop flow passage connected with the manifold to bypass said corresponding flow control valve, said bypass loop flow passage permitting flow of gas therethrough regardless of opened or closed state of said corresponding flow control valve.

5. The auto-switching sub-atmospheric pressure gas delivery system of claim 4, wherein the bypass loop flow passage has a restricted flow orifice element therein.

6. The auto-switching sub-atmospheric pressure gas delivery system of claim 1, wherein the sub-atmospheric pressure gas supply vessels comprise a gas storage and dispensing vessel containing a physical adsorbent material sorptively retaining gas thereon, and from which gas is dispensable in the gas dispensing operation involving flow of gas out of the manifold.

7. The auto-switching sub-atmospheric pressure gas delivery system of claim 6, wherein the physical adsorbent material comprises a sorbent material selected from the group consisting of zeolites, silica, alumina, and carbon.

8. The auto-switching sub-atmospheric pressure gas delivery system of claim 6, wherein the physical adsorbent material comprises bead activated carbon.

9. The auto-switching sub-atmospheric pressure gas delivery system of claim 6, wherein the gas sorptively retained on the physical adsorbent material comprises a gas dispensed for semiconductor manufacturing.

10. The auto-switching sub-atmospheric pressure gas delivery system of claim 6, wherein the gas sorptively retained on the physical adsorbent material comprises a gas selected from the group consisting of hydride gases, halide gases and gaseous organometallic compounds and complexes.

11. The auto-switching sub-atmospheric pressure gas delivery system of claim 6, wherein the gas sorptively retained on the physical adsorbent material comprises a gas selected from the group consisting of arsine, phosphine, boron trifluoride, boron trichloride, diborane, silane, and halosilanes.

12. The auto-switching sub-atmospheric pressure gas delivery system of claim 1, wherein the plurality of sub-atmospheric pressure gas supply vessels and gas dispensing manifold are contained in a gas cabinet.

13. The auto-switching sub-atmospheric pressure gas delivery system of claim 1, wherein the manifold is coupled in gas feed relationship with a semiconductor manufacturing facility.

14. The auto-switching sub-atmospheric pressure gas delivery system of claim 13, wherein the manifold is coupled in gas feed relationship with the semiconductor manufacturing facility by an interconnecting gas flow line having a mass flow controller disposed therein.

15. The auto-switching sub-atmospheric pressure gas delivery system of claim 1, wherein the controller comprises a central processing unit.

16. The auto-switching sub-atmospheric pressure gas delivery system of claim 1, wherein the controller is programmably arranged to carry out a cycle time program for auto-switching of the sub-atmospheric pressure gas supply vessels into sequential gas flow relationship with the manifold.

17. The auto-switching sub-atmospheric pressure gas delivery system of claim 16, wherein the controller is arranged to selectively operate each of the flow control valves via an associated valve actuator.

18. An auto-switching sub-atmospheric pressure gas delivery system comprising a gas cabinet containing a gas delivery manifold arranged for delivering gas from the gas cabinet, and a plurality of gas supply vessels each coupled in latent gas flow communication with the manifold for said delivery of gas from the gas cabinet from a selected one of the plurality of gas supply vessels, with means for valvably establishing gas flow from the selected one of the plurality of gas supply vessels to the manifold and valvably isolating selected other(s) of the plurality of gas supply vessels from gas flow communication with the manifold, a pressure transducer associated with each of the supply vessels, a CPU communicating with the pressure transducer associated with each of the supply vessels for auto-switching of the vessels in sequence for flow of gas from a selected one of the plurality of gas supply vessels to the manifold until its depletion followed by switching of a new selected one of the plurality of gas supply vessels to the manifold and isolation of the selected other(s) of the plurality of gas supply vessels, and restricted flow means for flowing gas from a selected one of the gas supply vessels at auto-switching thereof into gas flow communication with the manifold to pressurize the manifold prior to valvably establishing gas flow from the selected one of the plurality of gas supply vessels to the manifold, wherein a flow conductance of said restricted flow means ensures a gradual pressure increase downstream of said flow control valves.

19. A method of dispensing gas from an assembly of sub-atmospheric pressure gas supply vessels secured to a valved manifold arranged to selectively connect successive ones of the gas supply vessels in sequence to the manifold, by opening of an associated valve isolating a selected vessel from gas communication with the manifold and closing of an associated valve of a vessel depleted of gas, said method comprising restrictively flowing gas from the selected vessel into the manifold to gradually pressurize the manifold to an operating pressure level during switchover of gas supply from said vessel depleted of gas, to a previously isolated selected vessel.

20. A method of auto-switching sub-atmospheric pressure gas delivery, comprising:
providing a sub-atmospheric pressure gas delivery system as in claim 1;
flowing gas from a selected one of said plurality of sub-atmospheric pressure gas supply vessels to the gas dispensing manifold at a dispensing pressure, with the vessel valve of said selected one of said gas supply vessels open, the flow control valve associated with the selected one of the gas supply vessels open, and the vessel valve of a second one of said gas supply vessels closed, until pressure in the selected one of the gas supply vessels has declined to a level requiring switchover;

closing the vessel valve of said selected one of said gas supply vessels open and the flow control valve associated therewith, and concurrently opening the vessel valve of the second one of said gas supply vessels while maintaining the flow control valve associated with the second one of said gas supply vessels closed;

bleeding gas from the second one of said gas supply vessels through the bleed flow passage associated with the flow control valve for said second one of said gas supply vessels, until the gas pressure in the manifold rises to dispensing pressure; and when gas pressure in the manifold has risen to dispensing pressure, opening the flow control valve for said second one of said gas supply vessels.

21. The method of claim 20, wherein each one of the plurality of gas supply vessels is sequentially brought into gas dispensing relationship with the manifold.

22. The method of claim 20, wherein each flow control valve comprises a corresponding valve body with an inlet and an outlet each of which are joined in flow communication with the manifold, and wherein the bleed flow passage associated with a corresponding flow control valve comprises a bleed flow passage through the valve body of said corresponding flow control valve, interconnecting the inlet and outlet and permitting flow of gas therethrough regardless of opened or closed state of said corresponding flow control valve.

23. The method of claim 22, wherein the bleed flow passage comprises a passage drilled through the valve body.

24. The method of claim 20, wherein the bleed flow passage associated with a corresponding flow control valve comprises a bypass loop flow passage connected with the manifold to bypass said corresponding flow control valve, said bypass loop flow passage permitting flow of gas therethrough regardless of opened or closed state of said corresponding flow control valve.

25. The method of claim 24, wherein the bypass loop flow passage has a restricted flow orifice element therein.

26. The method of claim 20, wherein the sub-atmospheric pressure gas supply vessels comprise a gas storage and dispensing vessel containing a physical adsorbent material sorptively retaining gas thereon, and from which gas is dispensable in the gas dispensing operation involving flow of gas out of the manifold.

27. The method of claim 26, wherein the physical adsorbent material comprises a sorbent material selected from the group consisting of zeolites, silica, alumina, and carbon.

28. The method claim 26, wherein the physical adsorbent material comprises bead activated carbon.

29. The method of claim 26, wherein the gas sorptively retained on the physical adsorbent material comprises a gas dispensed for semiconductor manufacturing.

30. The method of claim 26, wherein the gas sorptively retained on the physical adsorbent material comprises a gas selected from the group consisting of hydride gases, halide gases and gaseous organometallic compounds and complexes.

31. The method of claim 26, wherein the gas sorptively retained on the physical adsorbent material comprises a gas selected from the group consisting of arsine, phosphine, boron trifluoride, boron trichloride, diborane, silane, and halosilanes.

32. The method of claim 20, wherein the plurality of sub-atmospheric pressure gas supply vessels and gas dispensing manifold are contained in a gas cabinet.

33. The method of claim 20, wherein the manifold is coupled in gas feed relationship with a semiconductor manufacturing facility.

34. The method of claim 33, wherein the manifold is coupled in gas feed relationship with the semiconductor manufacturing facility by an interconnecting gas flow line having a mass flow controller disposed therein.

35. The method of claim 20, wherein the controller comprises a central processing unit.

36. The method of claim 20, wherein the controller is programmably arranged to carry out a cycle time program for auto-switching of the sub-atmospheric pressure gas supply vessels into sequential gas flow relationship with the manifold.

37. The method of claim 36, wherein the controller is arranged to selectively operate each of the flow control valves via an associated valve actuator.

38. An auto-switching sub-atmospheric pressure gas delivery method comprising providing a gas cabinet containing a gas delivery manifold arranged for delivering gas from the gas cabinet, and a plurality of gas supply vessels each coupled in latent gas flow communication with the manifold for said delivery of gas from the gas cabinet from a selected one of the plurality of gas supply vessels, with means for valvably establishing gas flow from the selected one of the plurality of gas supply vessels to the manifold and valvably isolating selected other(s) of the plurality of gas supply vessels from gas flow communication with the manifold, and auto-switching the vessels in sequence for flow of gas from a selected one of the plurality of gas supply vessels to the manifold until its depletion followed by switching of a new selected one of the plurality of gas supply vessels to the manifold and isolation of the selected other(s) of the plurality of gas supply vessels, and flowing gas from a selected one of the gas supply vessels at auto-switching thereof into gas flow communication with the manifold to gradually pressurize the manifold prior to establishing gas flow from the selected one of the plurality of gas supply vessels to the manifold.

39. An auto-switchable sub-atmosphericpressure gas delivery system including a plurality of sub-atmosphericpressure gas supply vessels coupled to a valved gas dispensing manifold, wherein subsequent to auto-switching an on-line gas supply vessel is arranged to dispense gas for flow through the valved gas dispensing manifold for discharge therefrom, with a flow control valve in the manifold maintained in an open dispensing state during the flow through the valved gas dispensing manifold for discharge therefrom, and comprising means for restrictively flowing gas from the on-line gas supply vessel into the valved gas dispensing manifold to progressively build pressure in the valved gas dispensing manifold to a gas dispensing pressure level for said discharge with the flow control valve in the open dispensing state, and for opening the flow control valve to the open dispensing state after said gas dispensing pressure level has been reached.

40. An auto-switchable sub-atmosphericpressure gas delivery system according to claim 39, wherein said means are selected from the group consisting of:
a bleed flow passage in said flow control valve;
a gas flow by-pass loop associated with said flow control valve;
a valve actuator programmably arranged to actuate said flow control valve in a pressure-building mode selected from the group consisting of:
progressively opening of said flow control valve; and
pulsed opening/closing of said flow control valve.

41. An auto-switchable sub-atmosphericpressure gas delivery system according to claim 40, wherein said valve actuator is programmably arranged by coupling thereof with a central processing unit to actuate said flow control valve.

42. An auto-switchable sub-atmosphericpressure gas delivery system according to claim 41, wherein said means further comprise a pressure monitor in the manifold arranged to monitor manifold pressure in proximity to the on-line gas supply vessel during and subsequent to switchover, with the pressure monitor arranged in a feedback arrangement to the central processing unit so that the valve actuator is responsively operated to actuate said flow control valve.

43. An auto-switchable, sub-atmosphericpressure gas delivery system according to claim 40, wherein said means comprise a valve actuator programmably arranged to actuate said flow control valve in a pressure-building mode.

44. An auto-switchable, sub-atmosphericpressure gas delivery system according to claim 43, wherein said valve actuator is programmably arranged to actuate said flow control valve in a pressure-building mode by progressively opening said flow control valve.

45. An auto-switchable, sub-atmosphericpressure gas delivery system according to claim 43, wherein said valve actuator is programmably arranged to actuate said flow control valve in a pressure-building mode by pulsed opening/closing of said flow control valve.

* * * * *